United States Patent [19]

Hattori et al.

[11] Patent Number: 5,074,145
[45] Date of Patent: Dec. 24, 1991

[54] FAULT DIAGNOSTIC APPARATUS FOR A HYDRAULIC PRESSURE SOURCE

[75] Inventors: Kenji Hattori; Jiro Suzuki; Kazutoshi Tashima, all of Tochigi, Japan

[73] Assignee: Honda Giken Kogyo Kabushiki Kaisha, Tokyo, Japan

[21] Appl. No.: 623,137

[22] Filed: Dec. 6, 1990

[30] Foreign Application Priority Data

Dec. 7, 1989 [JP] Japan ................................. 1-141061

[51] Int. Cl.$^5$ .......................................... G01M 19/00
[52] U.S. Cl. .................................... 73/118.1; 340/453
[58] Field of Search ................ 73/118.1, 129, 121, 73/168; 340/453

[56] References Cited

U.S. PATENT DOCUMENTS 4,520,663 6/1985 Moore et al. ........................ 73/129
4,979,391 12/1990 Drake et al. ........................ 73/129

FOREIGN PATENT DOCUMENTS 56-40058 9/1981 Japan .

Primary Examiner—Jerry W. Myracle
Attorney, Agent, or Firm—Armstrong, Nikaido, Marmelstein, Kubovcik & Murray

[57] ABSTRACT

An apparatus for diagnosing a fault of a hydraulic pressure source, including a fluid tank, a pump for pumping up fluid from the fluid tank, an accumulator for accumulating the fluid pumped up by the pump, a pressure detector for detecting a pressure of the fluid in the accumulator and generating an output signal, a pump drive or motor responsive to the output signal for driving the pump, and an electromagnetic valve of normally closed type interposed either in a flow path between the accumulator and a hydraulic pressure instrument or in a flow path between the tank and the hydraulic pressure instrument. This apparatus comprises an excitation signal generator for generating an excitation signal which excites the electromagnetic valve for a predetermined period of time, and a control unit for determining an anomaly on the basis of the output signal from the pressure detector. If any fault exists in the hydraulic pressure source, fall and rise of the hydraulic pressure is not effected normally. The control unit determines whether the variation of the hydraulic pressure is normal or abnormal on the basis of the output signal from the pressure detector.

16 Claims, 2 Drawing Sheets

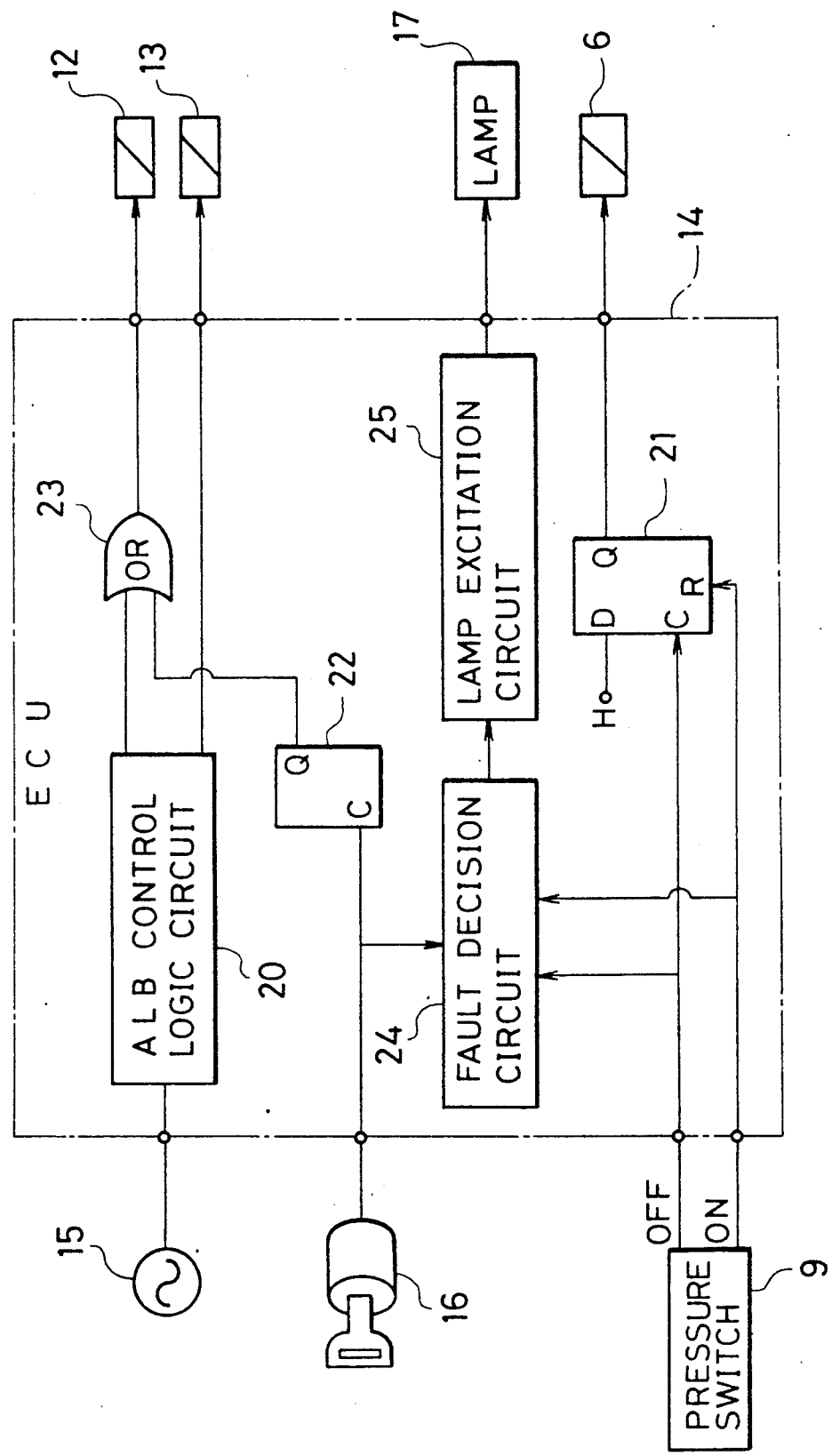

FAULT DIAGNOSTIC APPARATUS FOR A HYDRAULIC PRESSURE SOURCE

BACKGROUND OF THE INVENTION

The present invention relates to an apparatus for diagnosing a fault in a hydraulic pressure source for operating a hydraulic pressure instrument.

In the gazette of Japanese Patent Publication No. 56-40058(1981) is disclosed an operation inspecting apparatus for automatically inspecting an operating condition of an antilock control device which prevent locking of wheels upon emergency braking of a motor car. This apparatus is provided with many switches such as an operation detector switch for detecting an operation of a modulator provided in an oil path for leading a braking hydraulic pressure to wheel cylinders to control a hydraulic pressure applied to the wheel cylinders, a pressure switch for detecting a fluid pressure in an accumulator which accumulates control fluid to be fed to the modulator, and a drive detector switch for detecting a driving state of an engine, and a decision circuit determines whether a fault is present or not on the basis of the states of these switches. And provision is made such that in the case where the same decision circuit has determined that a fault is present, an alarm device such as a lamp, a buzzer, or the like may operate. By means of this apparatus a fault of a hydraulic pressure source for the above-mentioned modulator can be also detected.

However, in the above-described example of the apparatus in the prior art, since a large number of detection signals from the respective switches must be subjected to complicated signal processing and then input to the decision circuit, the construction of the inspecting apparatus becomes complex, and this becomes one cause of a high cost.

SUMMARY OF THE INVENTION

The present invention has been worked out in view of the above-mentioned shortcomings in the prior art, and one object of the present invention is to provide a fault diagnostic apparatus for a hydraulic pressure source, which can easily diagnose a fault of a hydraulic pressure source with a simple construction.

According to the present invention, there is provided an apparatus for diagnosing a fault of a hydraulic pressure source including a fluid tank, a pump for pumping up fluid from the above-mentioned fluid tank, an accumulator for accumulating the fluid pumped up by the aforementioned pump, pressure detecting means for detecting a pressure of the fluid accumulated in the above-mentioned accumulator and generating an output signal, pump drive means responsive to the aforementioned output signal for driving the above-mentioned pump, and an electromagnetic valve of normally closed type interposed either in a flow path between the above-mentioned accumulator and a hydraulic pressure instrument or in a flow path between the above-mentioned fluid tank and the hydraulic pressure instrument; characterized in that the apparatus comprises excitation signal generator means for generating an excitation signal which excites the aforementioned electromagnetic valve for a predetermined period of time, and decision means for determining anomaly on the basis of the output signal from the above-mentioned pressure detector means.

If the above-mentioned electromagnetic valve of normally closed type is excited for a predetermined period of time by the excitation signal generated from the above-described excitation signal generator means, the above-mentioned electromagnetic valve opens for the predetermined period of time, and during that period the hydraulic pressure in the accumulator is released via the hydraulic pressure instrument to the fluid tank. As a result, the hydraulic pressure lowers, and from the moment when the pressure detector means has detected that the pressure has lowered beyond a predetermined pressure, the pump is driven, therefore, the hydraulic pressure would rise at a constant rate, provided that the hydraulic pressure source, which comprises the fluid tank, the pump, the accumulator, the pressure detecting means and the pump driving means, is normal.

If any fault such as leakage of gas in the accumulator or the like should exist in the hydraulic pressure source, then the hydraulic pressure would present abnormal mode of rise or would not rise, and therefore, the decision means can detect the fault on the bases of an output signal from the pressure detector means.

BRIEF DESCRIPTION OF THE DRAWINGS

FIG. 2 is a block diagram of a control system making use of an electronic control unit (ECU).

DESCRIPTION OF THE PREFERRED EMBODIMENTS

Figure 1:
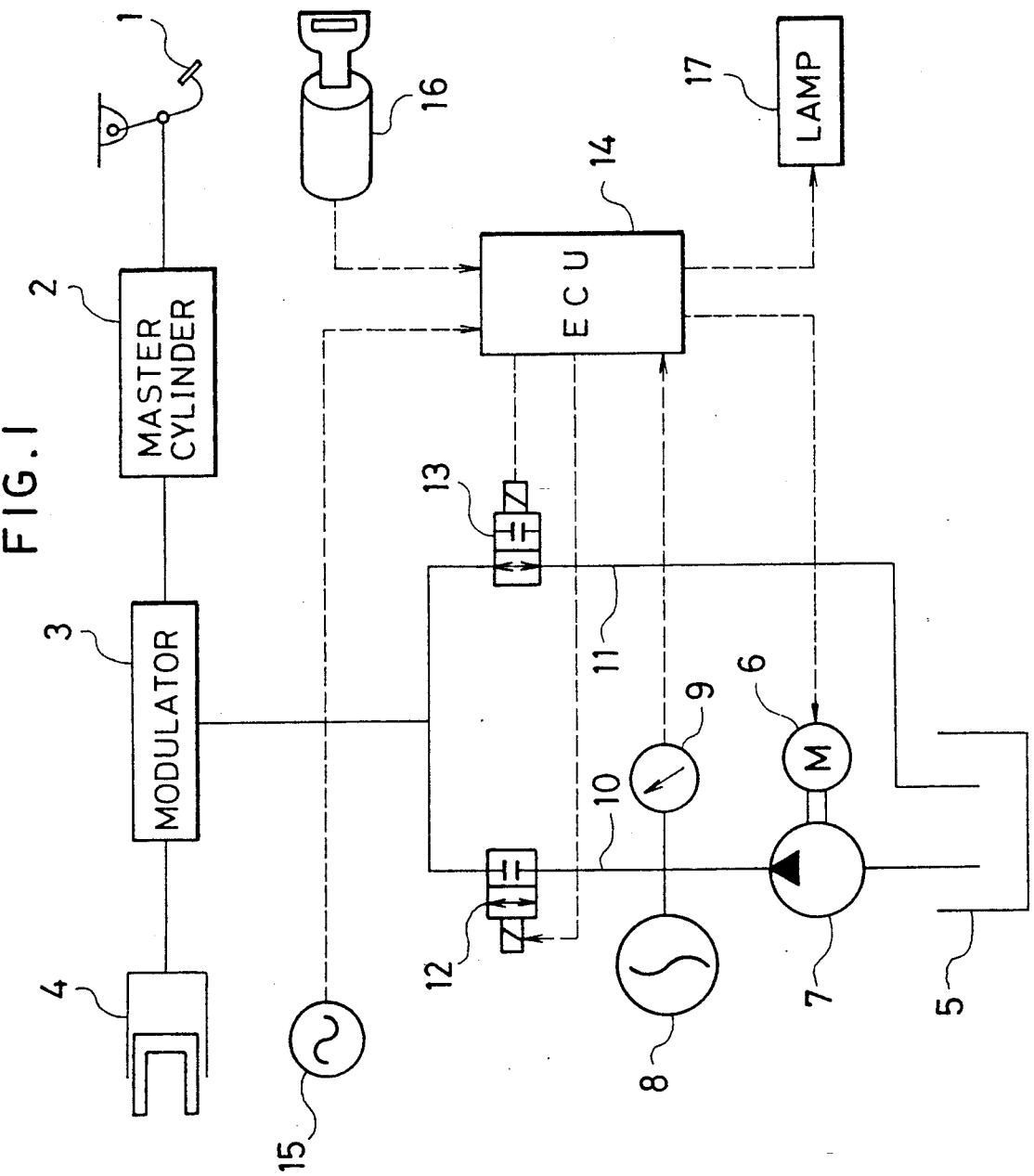
FIG. 1 is a system diagram of a hydraulic pressure control system according to one preferred embodiment of the present invention.

In the following, description will be made on one preferred embodiment of the present invention illustrated in FIGS. 1 and 2.

FIG. 1 is a schematic system diagram showing application of the present invention to a hydraulic pressure control system that is available for antilock brake control. If a black pedal 1 is actuated, a master cylinder 2 is operates, hence brake fluid is fed from the master cylinder 2 via a modulator 3 to brake cylinders 4 mounted to wheels, thus the brake cylinders 4 operate to brake the wheels. The modulator 3 interposed between the master cylinder 2 and the brake cylinders 4 serves to control a braking hydraulic pressure fed from the master cylinder 2 so that when the wheels have become a locking condition upon braking, it interrupts the braking hydraulic pressure fed to the brake cylinders 4 to release the locking condition. In the following, such control is called "antilock control".

The modulator 3 corresponds to the term "hydraulic pressure instrument" as used throughout this specification and the appended claims, and it is driven and controlled by a control hydraulic pressure fed from a hydraulic pressure source.

The hydraulic pressure source consists of a hydraulic pressure pump 7 driven by a motor 6 for pumping up pressure oil from an oil tank, an accumulator 8 and the like. A pressure condition of the accumulator 8 is detected by a pressure-sensitive switch 9 and a signal corresponding to the pressure condition is output from the pressure-sensitive switch 9.

By means of the above-described hydraulic source, pressure oil is fed to the modulator 3 through an oil path 10, or is returned from the modulator 3 to an oil tank 5 through an oil path 11. In these oil paths 10 and 11 are respectively interposed a first electromagnetic valve 12 and a second electromagnetic valve 13 to perform communication and interruption of the oil paths. The first electromagnetic valve 12 is an electromagnetic valve of normally closed type, and the second electromagnetic valve 13 is an electromagnetic valve of normally opened type. Drive control for these electromagnetic valves 12 and 13, and control for the motor 6 which drives the hydraulic pressure pump 7, are effected by control signals issued from an electronic control unit (ECU) 14.

The ECU 14 has a detection signal of the pressure switch 9 input thereto to use it for driving of the motor 6, and has a wheel speed signal detected by a wheel speed sensor 15 provided at the wheel input thereto to use it for control of the electromagnetic valves 12 and 13. Furthermore, in the illustrated embodiment, as will be described later, the ECU 14 has a signal of an ignition switch 16 input thereto to control the first electromagnetic valve 12 on the basis of this input signal.

An outline of an internal construction of the abovereferred ECU 14 is shown in FIG. 2. The detecting signal of the wheel speed sensor 15 is input to an ALB (antilock brake) control logic circuit 20, and control signals issued from the ALB control logic circuit 20 are output to the electromagnetic valves 12 and 13. More particularly, during a brake operation, if a braking force becomes excessively large and the wheels are about to enter a locking condition, control signals issued from the ECU 14 are applied to the first electromagnetic valve 12 and the second electromagnetic valve 13 to open the first electromagnetic valve 12 and close the electromagnetic valve 13, thereby the hydraulic pressure accumulated in the accumulator 8 is fed to the modulator 3, resulting in interruption of feed of the braking hydraulic pressure from the master cylinder 2 to the brake cylinders 4, and thereby an antilock control condition is established.

The detection signals of the pressure switch 9 are input to a flip-flop circuit 21, and control signals are output from the flip-flop circuit 21 to the motor 6. If the hydraulic pressure in the accumulator 8 lowers to a value lower than a first predetermined pressure, then an OFF signal from the pressure switch 9 is applied to a C-terminal of the flip-flop circuit 21, and a drive signal issued from the flip-flop circuit 21 is applied to the motor 6. Then, the hydraulic pressure pump 7 is operated by the motor 6, and a hydraulic pressure is fed to the accumulator 8. If the hydraulic pressure in the accumulator 8 becomes higher than a second predetermined pressure which is higher than the first predetermined pressure, an ON signal from the pressure switch 9 is applied to an R-terminal of the flip-flop circuit 21, then a drive stop signal is output from the flip-flop circuit 21 and applied to the motor 6, and operation of the hydraulic pressure pump 7 is stopped. Provision is made such that the hydraulic pressure in the accumulator 8 can be maintained always at a necessary pressure value through the above-mentioned control.

According to the present invention, within the above-described ECU 14 is provided a one-shot timer circuit 22, also in a circuit line between the ALB control circuit 20 and the first electromagnetic valve 12 is interposed an OR-circuit 23, and an output terminal of the one-shot timer circuit 22 is connected to an input terminal of the OR-circuit 23. To the one-shot timer circuit 22 is input a signal issued from the ignition switch 16. The one-shot timer circuit 22 generates an output rising in response to an ON signal from the ignition switch 16 when it is input to the one-shot timer circuit 22 and falling after a high level has been maintained for a predetermined period of time, and applies the output to the OR-circuit 23.

The ECU also comprises a fault decision circuit 24 to which the signal issued from the above-mentioned ignition switch 16 and the detection signals issued from the pressure switch 9 are input. This fault decision circuit 24 starts operation in response to an ON signal issued from the ignition switch 16 and monitors the detection signals issued from the pressure switch 9. And when it has determined that there is a fault, it applies an instruction signal to a lamp excitation circuit 25, and the lamp excitation circuit 25 excites an alarm lamp 17 to light.

In the above-described circuit construction, the first electromagnetic valve of normally closed type 12 is used not only for the conventional antilock control but also for fault diagnosis. In more particular, when the ignition switch 16 is put ON, the first electromagnetic valve 12 is excited to be transferred to an open condition for a determined period of time determined by the one-shot timer circuit 22.

When the first electromagnetic valve 12 is opened in this way, since the second electromagnetic valve 13 is held in an open condition just as before, the hydraulic pressure in the accumulator 8 is released through the oil paths 10 and 11 to the oil tank 5, and is thereby lowered. And if the hydraulic pressure in the accumulator 8 becomes lower than the first predetermined pressure, the pressure switch 9 detects this and outputs an OFF signal to the flip-flop circuit 21, and the hydraulic pressure pump 7 is actuated by the flip-flop circuit 21. Thereafter, the hydraulic pressure in the accumulator 8 would rise due to feed of pressurized oil from the hydraulic pressure pump 7. And if the hydraulic pressure reaches the second predetermined pressure, the pressure switch 9 output an ON signal, and actuation of the hydraulic pressure pump 7 is stopped by the flip-flop circuit 21. The pressure switch 9 detects the second predetermined pressure after an almost constant period of time following commencement of actuation of the hydraulic pressure pump 7, because the period of time depends upon the accumulation property of the accumulator 8.

The above-mentioned is an operation in the case where anomaly is not present in the hydraulic pressure source, but in the event that after closure of the first electromagnetic valve 12, the hydraulic pressure should not rise despite of actuation of the hydraulic pressure pump 7, one could consider that either any anomaly may exist in the hydraulic pressure pump 7 or in the accumulator 8 or leakage may be present in the oil path 10. The fault decision circuit 24 analyzes and processes the detection signals of the pressure switch 9, thus determines a signal condition other than a condition of normal detection signals, and when it has determined to be abnormal, it sends an instruction to the lamp excitation circuit 25, and alarms by lighting the lamp 17 by an excitation signal issued from the lamp excitation circuit 25. That is, when the period of time from the pump actuation commencement as a result of the pressure switch 9 detecting the first predetermined pressure until the pressure switch 9 detecting the second predetermined pressure deviates from the above-mentioned constant period, the fault decision circuit 24 determines to be abnormal and alarms.

In this way, fault diagnosis for the hydraulic pressure source can be effected each time the ignition switch 16 is put ON and the engine is started. In addition a fault of the hydraulic pressure source can be diagnosed with a simple construction by making use of the first electromagnetic valve 12 which is originally used for antilock control, and so this apparatus is advantageous also in view of a cost.

While the first electromagnetic valve is opened by the output signal of the one-shot timer circuit 22 based on the signal from the ignition switch 16, a flip-flop circuit could be utilized in place of the one-shot timer circuit 22. In this case, C-terminal of the flip-flop circuit is given the signal issued from the ignition switch 16, R-terminal is given OFF signal of the pressure switch 9 and an output signal of the flip-flop circuit is applied to the OR circuit 23. In this way, fault diagnosis can be effected certainly each time the engine is started.

While the first electromagnetic valve 12 is driven on the basis of a signal issued from the ignition switch 16 in the above-described embodiment, instead a charging signal issued from an alternator could be utilized. In addition, depending upon a pressure circuit, similar fault diagnosis can be effected even if the first electromagnetic valve 12 is formed in a normally opened type, the second electromagnetic valve 13 is formed in a normally closed type, and the second electromagnetic valve is exited for a predetermined period of time each time the engine is started. Furthermore, while the lamp 17 was used for the purpose of alarm, one may conceive to use a buzzer or the like as an alarm device.

As will be seen from the detailed description above, according to the present invention, a fault of a hydraulic pressure source can be easily diagnosed by means of a simple construction, in which an electromagnetic valve of normally closed type interposed in a flow path is utilized for fault diagnostic purpose and detection signals of a pressure switch are processed by decision means.

What is claimed is:

1. An apparatus for diagnosing a fault of a hydraulic pressure source, including a fluid tank, a pump for pumping up fluid form said fluid tank, an accumulator for accumulating the fluid pumped up by said pump, pressure detecting means for detecting a pressure of the fluid accumulated in said accumulator and generating an output signal, a hydraulic pressure instrument driven and controlled by a control pressure fed from said pump, pump drive means responsive to said output signal for driving said pump, and an electromagnetic valve of normally closed type interposed in a flow path between said tank and the hydraulic pressure instrument;

wherein said apparatus comprises excitation signal generator means generating an excitation signal which excites said electromagnetic valve for a predetermined period of time, and decision means for determining an anomaly on the basis of the output signal from said pressure detector means.

2. A fault diagnostic apparatus as claimed in claim 1, wherein said hydraulic pressure instrument is a modulator for antilock control purpose which is interposed in a hydraulic brake system of a vehicle.

3. A fault diagnostic apparatus as claimed in claim 2, wherein said excitation signal generator means is an ignition switch for starting an engine.

4. A fault diagnostic apparatus as claimed in claim 3, wherein said ignition switch is connected to said electromagnetic valve via a one-shot timer circuit.

5. A fault diagnostic apparatus as claimed in claim 2, wherein said electromagnetic valve is an electromagnetic valve for antilock control purpose, which operates in response to a wheel speed signal issued from a wheel speed sensor.

6. A fault diagnostic apparatus as claimed in claim 1, wherein said decision means consists of an electric circuit, to which the output signal form the pressure detector means are input, and watches rising of the pressure in said accumulator caused by driving said pump after said electromagnetic valve is excited to thereby determine anomaly.

7. A fault diagnostic apparatus as claimed in claim 1 or 6, wherein said pressure detector means is a pressure switch generates an ON-OFF signal in response to the hydraulic pressure.

8. A fault diagnostic apparatus as claimed in claim 1, wherein said excitation signal generator generates said citation signal which continues until said pressure detecting means generates an output signal for said pump drive means to drive said pump.

9. An apparatus for diagnosing a fault of a hydraulic pressure source, including a fluid tank, a pump for pumping up fluid from said fluid tank, a accumulator for accumulating the fluid pumped up by said pump, pressure detecting means for detecting a pressure of the fluid accumulate din said accumulator and generating an output signal, a hydraulic pressure instrument driven and controlled by a control hydraulic pressure fed from said pump, pump drive means responsive to said output signal for driving said pump, and an electromagnetic valve of normally closed type interposed in a flow path between said accumulator and said hydraulic pressure instrument;

wherein said apparatus comprises excitation signal generator means generating an excitation signal which excites said electromagnetic valve for a predetermined period of time, and decision means for determining an anomaly on the basis of the output signal from said pressure detector means.

10. A fault diagnostic apparatus as claimed in claim 9, wherein said hydraulic pressure instrument is a modulator for antilock control purpose which is interposed in a hydraulic brake system of a vehicle.

11. A fault diagnostic apparatus as claimed in claim 10, wherein said excitation signal generator means is an ignition switch for starting an engine.

12. A fault diagnostic apparatus as claimed in claim 11, wherein said ignition switch is connected to said electromagnetic valve via a one-shot timer circuit.

13. A fault diagnostic apparatus as claimed in claim 10, wherein said electromagnetic valve is an electromagnetic valve for antilock control purpose, which operates in response to a wheel speed signal issued from a wheel speed sensor.

14. A fault diagnostic apparatus as claimed in claim 9, wherein said decision means consists of an electric circuit, to which the output signal from the pressure detector means are input, and watches rising of the pressure in said accumulator caused by driving said pump after said electromagnetic valve is excited to thereby determine an anomaly.

15. A fault diagnostic apparatus as claimed in claim 9 or 14, wherein said pressure detector means is a pressure switch which generates an ON-OFF signal in response to the hydraulic pressure.

16. A fault diagnostic apparatus as claimed in claim 9, wherein said excitation signal generator generates said excitation signal which continues until said pressure detecting means generates an output signal for said pump drive means to drive said pump.

* * * * *